United States Patent

[11] 3,626,022

[72] Inventors Hiroshi Suzuki;
Yasusi Nakamura, both of Tokyo, Japan
[21] Appl. No. 720,360
[22] Filed Apr. 10, 1968
[45] Patented Dec. 7, 1971
[73] Assignee Asahidenka Kogyo Kabushiki Kaisha
Tokyo, Japan
[32] Priority Apr. 13, 1967
[33] Japan
[31] 42/23561

[54] HARDENABLE EPOXY RESIN CONTAINING CHELATES FROM METAL HALIDES, MONOEPOXIDES, AND CHELATE FORMING COMPOUNDS
9 Claims, No Drawings

[52] U.S. Cl. .................................................. 260/830 TW,
260/2 EC, 260/2 N, 260/2 BP, 260/13,
260/14, 260/15, 260/16, 260/17 R, 260/18 Ep,
260/28, 260/37 Ep, 260/38, 260/39 R, 260/40 R,
260/41 R, 260/47 EC, 260/47 EN, 260/47 EQ,
260/78, 260/4 Ep, 260/830 S, 260/830 P, 260/831,
260/834, 260/836, 260/837 R, 161/184
[51] Int. Cl. ..................................................... C08g 45/00,
C08g 45/12
[50] Field of Search ........................................ 260/47 EP,
47 EC, 2 EC, 830 TW

[56] References Cited
UNITED STATES PATENTS

| | | | | |
|---|---|---|---|---|
| 3,058,948 | 10/1962 | Mosimann | | 260/2 |
| 3,205,183 | 9/1965 | Vandenberg | | 260/47 |
| 3,272,853 | 9/1966 | Braun | | 260/2 |
| 3,275,598 | 9/1966 | Garty | | 260/47 |
| 3,298,999 | 1/1967 | Kiriyama | | 260/47 |
| 3,338,873 | 8/1967 | Gurgiolo | | 260/47 |
| 3,349,044 | 10/1967 | Spitzer | | 260/47 |
| 3,424,699 | 1/1969 | Stark | | 260/47 |
| 3,506,597 | 4/1970 | Asai | | 260/47 |

*Primary Examiner*—Paul Lieberman
*Attorney*—Woodhams, Blanchard and Flynn

ABSTRACT: An epoxy resin composition hardenable at a temperature of from about 0 to 5° C. is made by mixing (A) one or more epoxy compounds containing on the average more than one adjacent epoxy group per molecule, with (B) a hardener produced by reacting (1) at least one compound selected from the group consisting of boron halide, aluminum family metal halides, ferric halide and functional derivatives thereof with (2) at least one liquid mono-1,2-epoxide and (3) at least one aromatic chelate-forming compound having the formula:

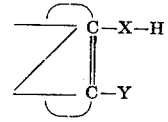

wherein X is an oxygen atom or a sulfur atom, Y is an organic radical containing an oxygen atom, a sulfur atom and a nitrogen atom and which can co-ordinate to said metal and Z is an organic radical which will make

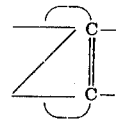

so as to represent a divalent aromatic radical.

HARDENABLE EPOXY RESIN CONTAINING CHELATES FROM METAL HALIDES, MONOEPOXIDES, AND CHELATE FORMING COMPOUNDS

BACKGROUND OF THE INVENTION

Field of the Invention

This invention relates to hardenable epoxy resin compositions.

More particularly, the invention relates to a hardenable epoxy resin composition which can be cured even at such low temperature as 0° to 5° C.

Still more particularly, the present invention relates to a rapidly hardenable epoxy resin composition from which can be obtained a hardened product having excellent physical properties.

DESCRIPTION OF THE PRIOR ART

As reactive curing agents for hardening epoxy resin, there have been conventionally used aliphatic polyamines, polyamides, aromatic polyamines, cyclic aliphatic polyamines, amino-substituted aliphatic alcohols and phenols and addition products of epoxides of low molecular weights containing oxirane oxygen and polyamines.

However, the curing of polyepoxides with such known conventional curing agents can be carried out rapidly only in a high-temperature range, such as of 40° to 160° C., conventionally 60° to 120° C.

Further, as conventional catalysts for accelerating the curing of polyepoxides, there are known such strongly acidic substances as sulfuric acid and phosphoric acid, such aromatic sulfonic acids as toluene sulfonic acid and benzene sulfonic acid, such Lewis acids as boron trifluoride and stannic chloride, such boron trifluoride-amine complex salts as boron trifluoride-monethylamine and boron trifluoride-piperidine, metallic alkoxides and chelates. However, none of them are sufficient for attaining the purpose of low-temperature hardening. For example, Lewis acid catalysts are quite high in activity but they have the disadvantages that they will generate heat so violently as not to be controllable during curing and that their pot-life is so short that hardened products for practical use cannot be obtained. Further, stannous acylate catalysts are effective in such temperature range as from 40° to 160° C. but they have the disadvantages that, at such low temperatures as from 0° to 5° C., they will not only retard the curing reaction but also will be relatively rapidly hydrolyzed to lose their activity. Accordingly, it has been desired to provide a hardenable epoxy resin composition which can be cured rapidly at a low temperature, such as from about 0° to 5° C.

It is an object of this invention to provide new chelates which can act as hardeners for epoxy resins.

It is another object of this invention to provide new curing agents for preparing hardened epoxy resins containing metal.

It is a further object of this invention to provide hardenable epoxy resin compositions from which can be obtained hardened epoxy resins containing metal and having excellent physical properties.

Another object of this invention is to provide new hardeners which can accelerate the hardening of epoxy resins in combination with other conventional curing agents so that there can be prepared hardened epoxy resins having excellent physical properties.

A further object of this invention is to provide epoxy resin compositions which are curable at low temperatures and from which can be obtained hardened epoxy resins having excellent physical properties.

A further object of this invention is to provide new hardeners which can harden epoxy resins rapidly at such low temperatures as from 0° to 5° C. and which can be used in combination with conventional curing agents to prepare hardened products having excellent physical properties.

A still further object of this invention is to provide rapidly curable epoxy resin compositions which contain special curing agents and which can be cured even at such low temperatures as from 0° to 5° C. and in the presence of water to form hardened products having excellent physical properties.

SUMMARY OF THE INVENTION

A hardenable epoxy resin composition of this invention contains as essential constituents A. an epoxy compound (I) or a mixture of epoxy compounds (I), said epoxy compound (I) containing on the average more than one adjacent epoxy group, preferably a terminal epoxy group, per molecule and B. a hardener (II) or a mixture of hardeners (II) produced by reacting
1. at least one metal halide or a functional derivative of a metal halide (II–a), as defined hereinafter, and
2. at least one liquid mono-1, 2-epoxide (II–b), and
3. at least one aromatic chelate-forming compound (II–c), as defined hereinafter, in the mole ratio of 1 : at least 1 : at least 1(mole : mole : mole).

The reaction mole ratio of (1) the metal halide or a functional derivative of the metal halide (II–1), (2) the liquid mono-1,2-epoxide (II–b), and (3) the aromatic chelate-forming compounds (II–c), in order to produce said hardener (II) according to this invention, may be varied within the range of the reaction mole ratio defined hereinbefore, but it is preferable to react (1) the metal halide or the functional derivative of the metal halide (II–a) and (2) the liquid mono-1,2-epoxide (II–b) and (3) the aromatic chelate-forming compound (II–c) in the mole ratio of 1 : 1~12 : 1~2 (mole : mole : mole), and it is especially preferable to react same in the mole ratio of 1 : 2~8 : 1~1.5 (mole : mole : mole).

However, the compositions of this invention may also contain, if desired, in addition to the essential constituents (A) and (B) indicated above C. an additional hardener (III), and/or D. a monoepoxide as a diluent for the epoxy resin, and/or E. a cyclic monovalent alcohol (IV), and/or F. a liquid aromatic carboxylic acid ester (V) and/or other inactive diluents or solvents, and/or G. an aromatic hydroxy carboxylic acid, for example, a hydroxy carboxylic acid which is included in the aromatic chelate-forming compounds (II–c) as defined hereinafter.

Mono-1,2-epoxides (II–b) which can be used for preparing the hardener (II) of the invention are liquid at room temperature and are of comparatively low-molecular weight. Preferred examples of mono-1,2-epoxides (II–b) include epoxides having the following general formula (1):

(1)

wherein Z represents a hydrogen atom, a methyl group or an ethyl group; A represents a hydrogen atom, an alkyl group, an alkenyl group, an aryl group, an aralkyl group, an alkaryl group, such groups having a halogen substituent, ether compound resides having the formula:

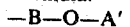

(wherein B represents an alkylene group containing one to four carbon atoms, A' represents an alkyl group, an aryl group such as phenyl group, an alkaryl group, an aralkyl group, an alkenyl group and such groups having a halogen substituent), ester compound resides having the formula:

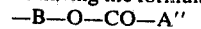

(wherein B represents, as before, an alkylene group containing one to four carbon atoms, A" represents an alkyl group, an alkaryl group, an alkenyl group, an aralkyl group, an aryl group such as phenyl group, and such groups having a halogen substituent), or ester compound residues having the formula:

(wherein B represents, as before, an alkylene group containing one to four carbon atoms, A' represents an alkyl group, an aralkyl group, an aryl group such as phenyl group, an alkaryl group such as alkyl-substituted phenyl group an alkenyl group, and such groups having a halogen substituent).

The especially preferable examples of the mono-1,2-epoxides (II–b) include, for example, alkylene oxides such as ethylene oxide, propylene oxide, isobutylene oxide; styrene oxide; halogen-substituted alkylene oxides such as epichlorohydrin, epibromohydrin, 1,2-epoxy-2-methyl-3-chloropropane; glycidyl ethers such as methyl glycidyl ether, ethyl glycidyl either, isopropyl glycidyl ether, isobutyl glycidyl either, chloroethyl glycidyl either, n-hexyl glycidyl either, n-octyl glycidyl either, phenyl glycidyl ether, chlorophenyl glycidyl ether, vinyl glycidyl ether, allyl glycidyl either; glycidyl esters such as glycidyl acetate, glycidyl propionate, glycidyl methacrylate, glycidyl acrylate, glycidyl benzoate, trialkyl acetic acid glycidyl ester; and other epoxy compounds such as, for example, α-methyl styrene oxide and butadiene monoxide.

The mono-1,2-epoxides (II–b) can be used individually or as mixtures thereof. The aromatic chelate-forming compounds (II–c) which can be used for preparing the hardener (II) of the invention are represented by the following general formula (A):

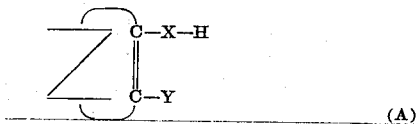

(A)

wherein X represents an oxygen atom or a sulfur atom, preferably an oxygen atom; Y represents an organic radical containing an oxygen, sulfur or nitrogen atom which can coordinate to boron, aluminum family metal, or iron atoms, preferably an organic radical containing an oxygen atom which can coordinate to said metal atom; and Z represents an organic radical which will make

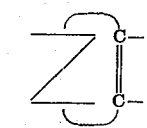

so as to respect a substituted or nonsubstituted divalent aromatic radical, preferably a phenylene group, a naphthylene group or a substituted group thereof. Organic radicals represented by the formula — Y include a carboxyl group, an aldehyde group, an acyl group containing one to six carbon atoms, an alkoxycarbonyl group containing two to seven carbon atoms, a nitro group, a nitroso group, and an acylamino group containing one to six carbon atoms.

Preferable examples of the aromatic chelate-forming compounds (II–c) include aromatic adjacent hydroxy-carboxylic acids such as salicylic acid, 1-hydroxy-1-naphthoic adic, 2-hydroxy-1-naphthoic acid, and 3-hydroxy-2-naphthoic acid; aromatic adjacent hydroxy-carboxylic acid derivatives in which one or more of the hydrogens is substituted by a group, such as a hydroxyl group, a lower alkyl group or the group represented by the symbol Y in the formula (A), such as 3-nitrosalicylic acid, chlorosalicylic acid, 3-aldehydesalicylic acid, 3-methylsalicylic acid, and 2,5-dihydroxylterephthalic acid; salicylic acid lower alkyl esters such as methyl salicylate, ethyl salicylate; salicylic acid lower alkenyl esters such as vinyl salicylate and allyl salicylate; O-lower acyl phenols such as O-hydroxyacetophenone, 0-hydroxypropiophenone and p-methyly-0-hydroxyacetophenone; 0-nitrophenol; 2,4-dinitrophenol; 1-nitroso-2-naphthol; 0-nitrothiophenol and 0-hydroxyacetanilide.

The preferable hardener (II) of the invention can be selected from the group comprising (1) hardeners (II–1) which are obtained by reacting aromatic chelate-forming compounds (II–c) with the reaction products of metal halides and/or the functional derivatives thereof (II–a) and the liquid mono-1,2-epoxides (II–b) and (2) hardeners (II-2) which are obtained by reacting liquid mono-1,2-epoxides (II–b) with the reaction products of metal halides or the functional derivatives thereof (II–a and the aromatic chelate-forming compounds (II–c).

The chemical structure of the complex compounds (II–ab) comprising of reaction product of (1) a metal halide or a functional derivative of the metal halide (II–a) and (2) a liquid mono-1,2-epoxide (II–b), which is an intermediate for preparing the hardener (II-1) of the invention is not clearly understood, but a typical example of the complex compound (II–ab) has an average composition which may be represented typically by the following formula (2):

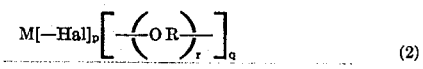
(2)

wherein M represents aluminum family metal atom, boron atom or iron atom, Hal represents a halogen atom but does not always combine with M, R represents a residue of mono-1,2-epoxide (II–b), for example a residue represented by the formula:

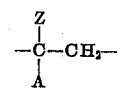

(wherein Z and A have the same significance as defined for the general formula (1)), p is about 3, r has values of from 1 to 12 inclusive, 1 has values of from 1 to 3 inclusive, however, rsp ranges from 1 to 12, preferably from 2 to 8.

The probable structure of the representative component of the preferable complex compound (II–ab) may be represented typically by the following general formula (3):

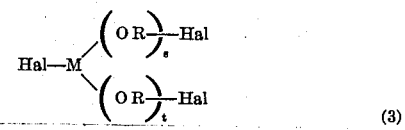
(3)

wherein M, Hal and R have the same significance as defined for the general formula (2), s and t range from 0 to 12, and s =t ranges from 2 to 8.

The chemical structure of the hardener (II–1) of the invention produced by reacting the complex compound (II–ab) described above with an aromatic chelate-forming compound (II–c) is not clearly understood, but a typical example thereof has an average composition which may be represented typically by the following general formula (4):

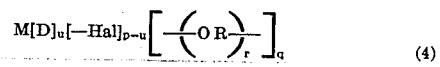
(4)

wherein M, Hal and R have the same significance as defined for the general formula (2), D represents the residue of the aromatic chelate-forming compound (II–c), p is about 3, r has values of from 1 to 12 inclusive, q has values of 1 to 2 inclusive, however rxp ranges for 1 to 12, u has values of 1 to 2 inclusive.

The probable structure of the representative active component of the preferable hardener (II–1) may be represented by the following general formula (%):

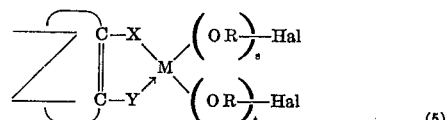
(5)

wherein M, Hal, R, s and t have the same significance as defined for the general formula (2), Z, X and Y have the same significance as defined for the general formula (A).

The chemical structure chelate (II–ac) produced by reacting (1) a metal halide or a functional derivative of the metal halide with (2) an aromatic chelate-forming compound (II–c) which is the intermediate of the hardener (II–2) is not clearly understood, but a typical example of the chelate (II–ac) has an average composition which may be represented typically by the following general formula (6):

$$M[D]_u[-Hal]_{p-u} \quad (6)$$

wherein M represents an aluminum family metal atom, a boron atom or an iron atom, Hal represents a halogen atom, D represents the residue of the aromatic chelate-forming compound (II–c), p is about 3 and u has values of 1 to 2 inclusive.

The probable structure of the representative component of the chelate (II–ac) may be represented by the following general formula (7):

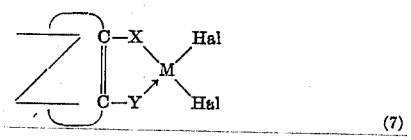

(7)

wherein M and Hal have the same significance as defined for the general formula (2), Z, X and Y have the same significance as defined for the general formula (A).

In the reaction for obtaining a complex compound (II–ab) of a metal halide (II–a) and a liquid mono-1,2-epoxide (II–b), the reaction conditions can be properly determined depending on the kinds of metal halides (II–a) and liquid mono-1,2-epoxides (II–b) used. However, generally metal halides (II–a) and liquid mono-1,2-epoxides (II–b) can be reacted at from 20° to 130° C. for 0.5 to 10.0 hours. For example, in case an alkylene oxide is to be used as the liquid mono-1,2-epoxide (II–b), it may be made to react at 20° to 60° C., preferably 30° to 50° C., for 20 to 100 hours. In case glycidyl ether, glycidyl ester or styrene oxide is to be used as the liquid mono-1,2-epoxide (II–b), for example, it may be made to react at 40° to 30° C., preferably 70 to 110° C., for 0.5 to 3 hours.

Thus, in a preferable reaction for obtaining a hardener (II) of the invention by reacting complex compounds (II–ab) with aromatic chelate-forming compounds (II–c), a complex compound (II–ab) and an aromatic chelate-forming compound (II–c) may be made to react at 20° to 100° C., preferably 40° to 50° C., for 0.5 to 5 hours.

Such reactions of a metal halide (II–a) and a liquid mono-1,2-epoxide (II–b) and of a complex compound (II–ab) and an aromatic chelate-forming compound (II–c) are carried out in an inert solvent, such as benzene or toluene. However, in the present invention, the above-mentioned reaction is carried out in aromatic alcohols, such as, for example, benzyl alcohol or cyclic alcohols, such as, for example, tetrahydrofurfuryl alcohol. Such alcohol solvents containing the obtained reaction product can be mixed as is with an epoxy resin (I).

Further, in the reaction for obtaining a chelate (II–ac) of a metal halide (II–a) and an aromatic chelate-forming compound (II–c), known conventional conditions can be used according to the above-mentioned conditions of the reaction of a complex compound (II–ab) and an aromatic chelate-forming compound (II–c).

Further, in order to obtain a hardener (II–2) from a chelate (II–ac) and a liquid mono-1,2-epoxide (II–b), a chelate (II–ac) and a liquid mono-1,2-epoxide (II–b) may be made to react with each other according to the above-mentioned conditions of the reaction for obtaining a complex compound (II–ab) from a metal halide (II–a) and a liquid mono-1,2-epoxide (II–b).

The hardener (II) of the invention, for example, hardener (II–1) obtained from a complex compound (II–ab) (the complex of a metallic halide (II–a) and a liquid mono-1,2-epoxide (II–b)) and a chelate-forming compound (II–c), and the hardener (II–2) obtained from a chelate (II–ac) (the chelate of a metal halide (II–a) and an aromatic chelate-forming compound (II–c)) and a liquid mono-1,2-epoxide (II–b) are stable, and are high in compatibility with the epoxy compound (I) and the other possible constituents and will cause no violent reaction in hardening epoxy resins such as in the case of using Lewis acid catalysts, and their curing reactions can be easily controlled.

The epoxy compounds (I) which may be used in the compositions of this invention include, for example, epoxy compounds (I–1) containing on the average more than one substituted or nonsubstituted glycidyl ether group which is represented by the general formula:

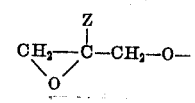

(wherein Z represents a hydrogen atom, a methyl group or an ethyl group) per molecule; epoxy compounds (I–2) containing on the average more than one substituted or nonsubstituted glycidyl ester group which is represented by the general formula:

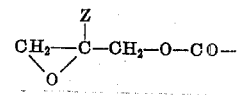

(wherein Z represents a hydrogen atom, a methyl group or an ethyl group) per molecule; epoxy compounds (I–3) containing on the average more than one substituted or nonsubstituted N-substituted 1,2-epoxy propyl group which is represented by the general formula:

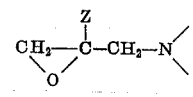

(wherein Z represents a hydrogen atom, a methyl group or an ethyl group) per molecule.

Said epoxy compounds (I–1) containing on the average more than one substituted or nonsubstituted glycidyl ether group per molecule, may be prepared by glycidyletherifying phenolic hydroxyl groups, or glycidyletherifying alcoholic hydroxyl groups.

Examples of the preferable epoxy compounds (I–1) include, for example, polyglycidyl ethers (I–1–1) of polyhydric phenol containing one or more aromatic nuclei, polyglycidyl ethers (I–1–2) of alcoholic polyhydroxyl compounds derived by the addition reaction of polyhydric phenols containing one or more aromatic nuclei with alkylene oxides containing two to four carbon atoms.

Said polyglycidyl ethers (I–1–1) include, for example, epoxide compounds containing, as the main reaction product, polyglycidyl ethers obtained by reacting polyhydric phenols (A) containing at least one aromatic nucleus with epihalohydrins (b) in the presence of basic catalysts or basic compounds, such as sodium hydroxide, epoxide compounds obtained by reacting polyhalohydrin ethers, obtained by reacting polyhydric phenols (A) containing at least one aromatic nucleus with epihalohydrins (b) in the presence of catalytic amounts of basic catalysts such as triethyl amine, with basic compounds such as sodium hydroxide.

Such polyglycidyl ethers (I–1–2) include, for example, epoxide compounds containing, as the main reaction product, polyglycidyl ethers obtained by reacting polyhalohydrin ethers, obtained by reacting polyhydroxyl compounds (B) derived by the addition reaction of polyhydric phenols containing at least one aromatic nucleus with alkylene oxides containing two to four carbon atoms, with epihalohydrins (b) in the presence of catalytic amounts of acid catalysts such as boron trifluoride, with basic compounds such as sodium hydroxide.

Said polyhydric phenols containing at least one aromatic nucleus (A) include polyhydric mononuclear phenols containing one aromatic nucleus (A-1), and polyhydric polynuclear phenols containing at least two aromatic nuclei (A-2).

Illustrative polyhydric mononuclear phenols (A-1) include, for example, resorcinol, hydroquinone, pyrocatechol, phloroglucinol, 1,5-dihydroxy naphtalene, 2,7-dihydroxy naphthalene, 2,6-dihydroxy naphthalene and the like.

Illustrative polyhydric polynuclear phenols (A-2) include dihydric polynuclear phenols having the following general formula (8):

(8)

wherein: $A_r$ is an aromatic divalent hydrocarbon radical such as naphthylene and phenylene, with phenylene being preferred for purposes of this invention: $Y'$ and $Y_1$, which can be the same or different, are alkyl radicals such as methyl, n-propyl, n-butyl, n-hexyl, n-octyl and the like, preferably alkyl radicals having a maximum of four carbons atoms, or halogen atoms, i.e., chlorine, bromine, iodine, or fluorine, or alkoxy radicals such as methoxy, methoxymethyl, ethoxy, ethoxyethyl, n-butoxy, amyloxy and the like, preferably an alkoxy radical having a maximum of four carbon atoms (it is to be understood that whenever there are substituents exclusive of the hydroxyl groups on either or both of the aromatic divalent hydrocarbon groups, that these substituents can be the same or different); $m$ and $z$ are integers having a valve of from 0 to a maximum value corresponding to the number of hydrogen atoms on the aromatic ring ($A_4$) which can be replaced by substitutents and can have the same or different values; and $R_1$ is a divalent radical, as for example

or $-O-$, or $-S-$, or $-SO-$, or $-SO_2-$,
or a divalent hydrocarbon radical as, for example, an alkylene radical such as methylene, ethylene, trimethylene, tetramethylene, pentamethylene, hexamethylene, 2-ethyl hexamethylene, octamethylene, nonamethylene, decamethylene, and the like, an alkylidene radical such as ethylidene, propylidene, isopropylidene, isobutylidene, amylidene, isoamylidene, 1-phenyl ethylidene and the like, or a cycloaliphatic radical, such as 1,4-cyclohexylene, 1,3-cyclohexylene, cyclohexylidene, and the like, or halogenated alkylidene, alkylene or cycloaliphatic radicals, alkoxy and aryloxy substituted alkylidene, alkylene or cycloaliphatic radicals, such as methoxy methylene, ethoxy methylene, ethoxy ethylene, 2-ethoxy trimethylene, 3-ethoxy pentamethylene, 1,4-(2-methoxycyclohexane), phenoxy ethylene, 2-phenoxy trimethylene, 1,3-(2-phenoxy cyclohexane), and the like, aralkylene radicals, such as phenyl ethylene, 2-phenyl trimethylene, 1pentamethylene, 2-phenyl decamethylene, and the like, aromatic radicals, such as phenylene, napthylene, and the like, halogenated aromatic radicals, such as 1,4-(2-chlorophenylene), 1,4-(2-bromophenylene), 1,4-(2-fluorophenylene), and the like; alkoxy and aryloxy substituted aromatic radicals, such as 1,4-(2-methoxyphenylene), 1,4-(2-ethoxyphenylene), 1,4-(2-n-propoxyphenylene), 1,4-(2-phenoxyphenylene), and the like, alkyl substituted aromatic radicals, such as 1,4-(2-methylphenylene), 1,4-(2-ethylphenylene), 1,4-(2-n-propylphenylene), 1,4-(2-n-butylphenylene), 1,4-(2-n-dodecylphenylene) and the like, or $R_1$ can be a ring which is fused to one of the $A_r$ groups as is the case, for example, in the compound having the formula:

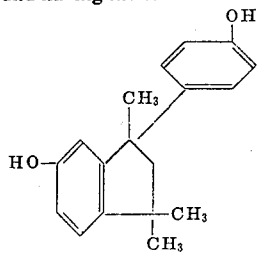

or $R_1$ can be a polyalkoxy radical such as polyethoxy, polypropoxy, polythioethoxy, polybutoxy, polyphenylethoxy, or $R_1$ can be a radical containing a silicon atom as, for example, polydimethylsiloxy, polydiphenylsiloxy, polymethylphenylsiloxy and the like, or $R_1$ can be two or more alkylene or alkylidene radicals separated by an aromatic ring, a tertiary amino group, an ether linkage, a carbonyl group or separated by a linkage containing sulfur such as sulfur, sulfoxide and the like.

Particularly preferred as the dihydric polynuclear phenols are compounds having the general formula:

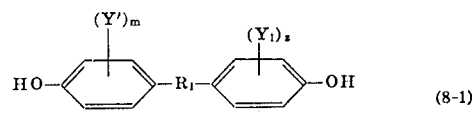
(8-1)

wherein $Y'$, $Y_1$, are as previously defined, $m$ and $z$ have values of from 0 to 4 inclusive and $R_1$ is an alkylene or alkylidene group, preferably having from one to three carbon atoms inclusive or $R_1$ is a phenylene group having the formula

or $R_1$ is a saturated group having the formula:

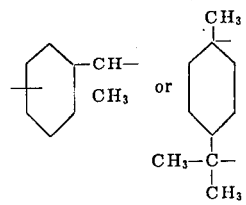

Exemplary of specific dihydric phenols include among others the bis-(hydroxyphenyl)-alkanes such as 2,2-bis-(p-hydroxyphenyl)-propane, commonly referred to as bisphenol-A,2,4'-dihydroxy diphenylmethane, bis-(2-hydroxy-phenyl)-methane, bis-(4-hydroxyphenyl)-methane, bis-(4-hydroxy-2,6-dimethyl-3-methoxyphenyl)-methane, 1,1-bis-(4-hydroxyphenyl)-ethane,1,2-bis-(4-hydroxyphenyl)-ethane, 1,1-bis-(4hydroxy-2-chlorophenyl)-ethane,1,1-bis-(3,5-di-methyl-4-hydroxyphenyl)-ethane,1,3-bis-(3-methyl-4-hydroxyphenyl)-propane, 2,2-bis-(3-phenyl-4-hydroxyphenyl)-propene,2,2-bis-(3isopropyl-4-hydroxyphenyl)-propane,2,2-bis-(2-isopropyl-4-hydroxyphenyl)-propane,2,2-bis-(4-hydroxynaphthyl)-propane,2,2-bis-(4-hydroxyphenyl)-pentane,3,3-bis-(4-hydroxyphenyl)-pentane,2,2-bis-(4-hydroxyphenyl)-heptane,bis-(4-hydroxyphenyl)-phenylmethane,bis-(4-hydroxyphenyl)-cyclohexylmethane,1,2-bis-(4hydroxyphenyl)-1,2-bis-(phenyl)-propane,2,2-bis-(4hydroxyphenyl)-1-phenylpropane and the like; dihydroxybiphenyls such as 4,4'-dihydroxybiphenyl,2,2'dihydroxybiphenyl,2,4-dihydroxybiphenyl and the like; di(hydroxyphenyl)-sulfones such as bis (4-hydrophenyl)-sulfone,2,4'-dihydroxydiphenyl sulfone,5'-chloro-2,4'-dihydroxydiphenyl sulfone,5'-chloro-4,4'-dihydroxydiphenyl sulfone,3'-chloro-4,4'-dihydroxy diphenyl sulfone and the like; di(hydroxyphenyl) ethers such as bis-(4-hydroxyphenyl)-ether, the 4,3'-,4,2'-,2,2'-,2,3'-,di-hydroxydiphenyl ethers, 4,4'-dihydroxy- 2,6-dimethyldiphenyl ether,bis-(4-hydroxy-3-isobutylphenyl)-ether,bis-(4-hydroxy-3-isopropylphenyl)-ether,bis-(4-hydroxy-3-chlorophenyl)-ether,bis-(4-hydroxy-3-fluorophenyl)-ether,bis-(4-hydroxy-3-bromo-phenyl)-ether,bis-(4-hydroxynaphthyl)-ether,bis-(4-hydroxy-3-chloronaphthyl)-ether,bis-(2-hydroxybiphenyl)-ether,4,4'-dihydroxy-2,6-dimethoxydiphenyl either,4,4'-dihydroxy-2,5-diethoxydiphenyl ether, and the like; also suitable are 1,1-bis-(4hydroxyphenyl)-2-phenylethane, 1,3,3'-trimethyl-1-(4-hydroxyphenyl)-6-hydroxyindane, 2,4-bis-(p-hydroxyphenyl)-4methylpentane and the like.

Also preferred are other dihydric polynuclear phenols having the general formula:

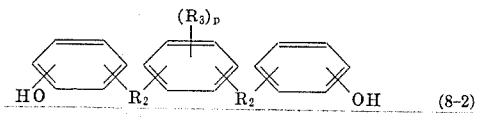 (8-2)

wherein $R_3$ is a methyl or ethyl group, $R_2$ is an alkylidene or other alkylene having from one to nine carbon atoms, $p$ ranges zero to 4. Examples of dihydric polynuclear phenols having the formula (8-2) include 1,4-bis-(4-hydroxybenzyl)benzene, 1,4-bis-(4hydroxybenzyl)tetramethylbenzene, 1,4-bis-(4hydroxybenzyl)tetraethylbenzene, 1,4-bis-(p-hydroxycumyl)benzene, 1,3-bis-(p-hydroxycumyl)benzene and like.

Other examples of polyhydric polynuclear phenols(A-2) include, for example, pre-condensation products of phenols with carbonyl compounds, (for example, precondensation products of phenol resin, condensation products of phenols with acroleins, condensation products of phenols with glyoxal, condensation products of phenols with pentanedial, condensation products of resorcinols with acetone, and precondensation products of xylenes-phenols with formalin), condensation products of phenols with polychloromethylated aromatic compounds (for example, condensation products of phenols with bischloromethylxylene).

The polyhydroxy compound (B) here is a compound which is obtained by reacting the above-mentioned polyhydric phenols (A) having at least one aromatic nucleus with an alkylene oxide in the presence of such catalysts as will accelerate the reaction of the OH group and the epoxy group and which has atomic groups of —ROH (wherein R is an oxide) and/or—$(RO)_nH$ group derived from an alkylene oxide) and/or —$(R))_nH$ (wherein R is an alkylene group derived from an alkylene oxide, one polyoxyalkylene chain may contain different alkylene groups and $n$ is an integer of 2 or more showing the polymerized number of oxyalkylene groups) bonded with said phenol residue by an ether bond. In this case, the ratio of alkylene oxide to said polyhydric phenol (A) is made more than 1:1 (mol:mol). But, preferably, the ratio of the alkylene oxide to the OH group of said polyhydric phenol (A) is 1 to 10:1 or particularly 1 to 3:1 by equivalents.

Said alkylene oxides include, for example, ethylene oxide, propylene oxide and butylene oxide, and particularly preferred are those which will bring forth branched chains in the case of producing ether linkages by their reaction with polyhydric phenols. Preferable examples thereof include propylene oxide and 2,3-butylene oxide, and a particularly preferable example thereof is propylene oxide.

Particularly preferred among the polyhydroxyl compounds (B) are those having the following general formula:

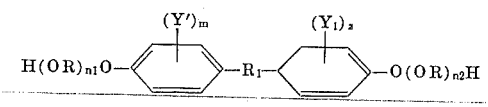

wherein $Y'$, $Y_1$, $m$, $z$ and $R_1$ have the same significance as defined for the general formula (8–1), R is an alkylene group containing two to four carbon atoms, and $n_1$ and $n_2$ range from one to three.

In addition, preferred among the polyhydroxyl compounds (B) are those having the following general formula:

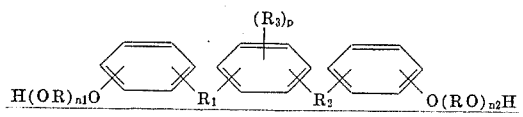

wherein $R_1$, $R_2$ and $R_3$ have the same significance as defined for the general formula (8-2), R is an alkylene group containing two to four atoms, and $n_1$ and $n_2$ range from one to three.

The epihalohydrin (b) is represented by the following general formula:

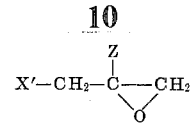 (9)

wherein Z represents a hydrogen atom, a methyl group or an ethyl group, and $X'$ represents a halogen atom.

Examples of epihalohydrins (b) include, for example, epichlorohydrin, epibromohydrin, 1,2-epoxy-2-methyl-3-chloropropane, 1,2-epoxy-2-ethyl-3-chloropropane.

Examples of acid catalysts which can be used for accelerating the reaction of epihalohydrins (b) with polyhydric phenols (A) or polyhydroxyl compounds (B) include, for example, Lewis acids such as boron trifluoride, stannic chloride, zinc chloride and ferric chloride, active derivatives of Lewis acid such as boron trifluoride etherate and mixtures thereof.

Examples of basic catalysts which can be used for accelerating the reaction of epihalohydrins (b) with polyhydric phenols (A) include, for example, alkali metal hydroxides such as sodium hydroxide, alkali metal alchoholates such as sodium ethylate, tertiary amines such as triethyl amine and triethanol amine, quaternary ammonium compounds such as tetramethylammonium bromide, and mixtures of them.

Examples of basic compounds which can be used for preparing glycidyl ethers at the same time when epihalohydrins (b) react with polyhydric phenols (A), or for preparing glycidyl ethers by dehydrohalogenating halohydrin ethers obtained by reacting epihalohydrins (b) with polyhydric phenols (A) include, for example, alkali metal hydroxides such as sodium hydroxide, alkali metal aluminates such as sodium aluminate, and the like.

It is needless to say that these catalysts or basic compounds can be used as they are or in the form of solutions in suitable inorganic and/or organic solvents.

Further, as epoxy compounds (I-2) having an average of more than one substituted or nonsubstituted glycidyl ester group in the molecule, there are polyglycidyl esters of aliphatic polycarboxylic acids or aromatic polycarboxylic acids. For example, there is included an epoxy resin such as is obtained by polymerizing glycidyl methacrylate synthesized from an epihalohydrin (b) represented by the above-mentioned general formula (9) and methacrylic acid.

Further, as examples of epoxy compounds (I-3) having an average of more than one substituted or nonsubstituted N-substituted 1,2-epoxypropyl group in the molecule, there can be enumerated epoxy resins obtained from aromatic amines (for example, aniline or aniline having alkyl substituent(s) in the nucleus) and epihalohydrins (b) represented by the above-mentioned general formula (9) and epoxy resins obtained from precondensates of aromatic amines and aldehydes (for example, aniline-formaldehyde precondensates or aniline-phenol-formaldehyde precondensates) and epihalohydrins (b).

The other hardeners (III) which can be contained, if desired, include compounds or substances having an action of accelerating the reaction of epoxy resins, compounds or substances having reactivity with epoxy resins, compounds or substances accelerating the reaction of curing epoxy resins, compound or substances having some of such properties or mixtures thereof. Examples of the other hardeners (III) include those of from very low molecular weights to high molecular weights and also include such organic compounds having amino, carboxyl, carboxylic anhydride (—CO—O—CO—), hydroxyl, —SH, —NCO, —NCS and —CONH— groups as mentioned below.

Examples of preferable other hardeners (III) which can harden the epoxy resin rapidly at such low temperatures as from 0° to 5° C. in combination with the hardener (II) of the present invention include, for example, aliphatic polyamines such as ethylene diamine, diethylene triamine, triethylene tetramine, dipropylene triamine, dimethylaminopropylamine, diethylaminopropylamine and cyclohexylaminopropylamine; aliphatic hydroxy monoamines such as monoethanol amine, diethanol amine, propanol amine and N-methyl-ethanol amine; aliphatic hydroxy polyamines such as aminoethylethanol amine, monohydroxyethyldiethylene triamine, bishydroxyethyldiethylene triamine and N-(2-hydroxypropyl) ethylene diamine; polyamides obtained from dimerised fatty acids and diamines such as ethylene diamine; modified aliphatic amine hardeners obtained by reacting some of the above-mentioned amines or polyamides with stoichiometrically insufficient amounts of liquid epoxy compounds containing on the average two or less 1,2-epoxy groups per molecule; aromatic amines such as aniline, toluidene, ethylaniline, xylidine, benzidine, 4,4'-diaminodiphenylmethane, 2,2-bis (4-aminophenyl) propane, 4,4'-diaminodiphenylether, 4,4'-diaminodiphenylsulfone, 4,4'-diaminobenzophenone, 2,2'-dimethyl-4,4'-diaminodiphenylmethane, 2,4'-diaminobiphenyl, 3,3'-dimethyl-4,4'-diaminobiphenyl and 3,3'-methoxy-4,4'-diaminobiphenyl; precondensation products of aromatic amines with aldehydes or active derivatives of aldehyde (for example, aliphatic lower aldehydes such as formaldehyde, paraformaldehyde, acetaldehyde, chloral and the like, preferably formaldehyde or its active derivative); precondensation products of aromatic amines with phenols (for example, phenol, cresol, xylenol, ethylphenol, chlorophenol and anisol) with aldehydes or active derivatives of aldehyde; amine adducts, i.e., modified aromatic amine hardeners, obtained by reacting some of the above-mentioned aromatic amines or precondensation products and stoichiometrically insufficient amounts of liquid epoxy compounds containing on average two or less 1,2-epoxy groups per molecule.

Especially preferable examples of the other hardener (III) include the addition product of an aromatic amine and a liquid epoxy compound containing on the average two or less 1,2-epoxy groups per molecule, such as the addition product of an aromatic amine and a diglycidyl ether of 2,2-bis (4-hydroxylphenyl)-propane, the addition product of an aromatic amine and a diglycidyl ether of glycol in which propylene oxides have been added to 2,2-bis(4-hydroxyphenyl)-propane, and the addition product of an aromatic amine and a diglycidyl ether of 2,2-bis(4-hydroxyphenyl)-propane and a diglycidyl ether of glycol in which propylene oxides have been added to 2,2-bis(4-hydroxyphenyl)-propane.

The addition products of an aromatic amine selected from the above-mentioned aromatic amines and the above-mentioned aromatic amine-aldehyde precondensates with the above-mentioned liquid epoxy compound or preferably a combination of such addition product and an aromatic hydroxyl carboxylic acid, preferably, hydroxyl carboxylic acid belonging to an aromatic chelate-forming compound (II–c), are especially preferable for hardening the epoxy compound (I) at low temperatures in combination with the hardener (II) of the present invention.

Other examples of the other hardener (III) include cyclic aliphatic amines such as piperazine, N-aminoethylpiperazine and triethylenediamine; aromatic primary amines such as metaphenylenediamine, metaxylenediamine, paraxylenediamine, p,p'-diaminodiphenylmethane and diaminodiphenylsulfone; aromatic tertiary amines such as benzyldimethylamine and tri-(dimethylaminomethyl)-benzene; $BF_3 \cdot C_2H_5NH_2$; $BF_3 \cdot 3$ trialkanolamine borates; titanic acid amine salts; cyanoethylated polyamines; precondensation products of melamine resins; and precondensation products of amino resins.

Examples of hardeners containing a carboxyl group or hardeners which belong to carboxylic acid anhydrides, include, for example, phthalic acid, maleic acid, trimellitic acid, pyromellitic acid, tetrahydrophthalic acid, hexahydrophthalic acid, tetrachlorophthalic acid, dodecenylsuccinic acid, endomethylenephthalic acid, methylendomethylenephthalic acid, hexachloromethylenetetrahydrophthalic acid, dichloromaleic acid and acid anhydride thereof, acidic polyester resins, copolymers of maleic acids or maleic acid anhydrides and other polymerizable vinyl compounds (for example, styrene); partial esters of said copolymers; copolymers of maleic acid esters and polymerizable vinyl compounds.

Other examples of the other hardener (III) containing a nitrogen atom, include, for example, dicyandiamide, guanidine, polyurethane prepolymers containing NCO groups and precondensation products of urea resins.

Examples of the other hardeners (III) containing an OH group, include polyhydric phenols, precondensation products of phenol resins, polysulfide resins and the like.

Examples of cyclic monovalent alcohols (IV) include, for example, tetrahydrofurfuryl alcohol, cyclopentanol and cyclohexanol, preferably tetrahydrofurfuryl alcohol.

The preferable examples of aromatic carboxylic acid esters (V) include, for example, phthalic acid esters such as dioctyl phthalate, dibutyl phthalate, dihexyl phthalate and the like.

With regard to the ratios of the epoxy compound (I) and the hardener (II) used pursuant the invention, from 0.01 to 35 percent by weight, preferably 1 to 30 percent, by weight of the hardener (II), based on the weight of the epoxy compound (I), may be added to the epoxy compound (I). As a method of adding the hardener (II), it may be dissolved directly into the epoxy compound (I), or it may be dissolved into the other hardener (III) in advance and may be combined with the epoxy compound (I) or it may be dissolved into a proper solvent and may be combined with the epoxy compound (I) or its mixture with the other hardener (III) or the like when the composition is hardened.

As regards the amount of the other hardener (III) to be used, the respective equivalents can be calculated from the equivalent on the epoxy group contained in the epoxy compound (I) and the equivalent on the reactive hydrogen atom contained in the hardener. However, in case of the hardening of the epoxy resin, it will be possible to use ratios over a comparatively wide range above and below such equivalent value. Such ratio can be determined by properly applying a conventional technique known in hardening epoxy resins.

The amount of the monohydric alcohol (IV) having a cyclic structure added to the composition may be less than 10 percent by weight of the epoxy compound (I).

Further, the amount of the liquid aromatic carboxylic acid ester (V) added to the composition may be less than 50 percent by weight in the case of using the other hardener (III).

Any other additive may be added, as required, to the polyepoxide hardenable composition according to the present invention. As examples of such additives, there can be enumerated, for example, silica powders, bitumens, celluloses, glass fibers, clays, micas, aluminum powders, aerosols and the like.

An effect of the present invention is to be able to provide a hardenable epoxy compound composition which can be hardened within a short time even at such low temperature as from 0° to 5° C.

Another effect of the present invention is to be able to provide an hardenable epoxy compound composition which can be hardened at low temperature in the presence of water.

The hardened product of the hardenable epoxy resin composition according to the present invention has physical properties better than those of any conventional epoxy resin hardened product and is remarkably higher in such properties as, for example, the adhesion strength (tensile-shearing strength), hardness and chemical resistance.

DESCRIPTION OF THE PREFERRED EMBODIMENTS

The invention will be further described with reference to the following examples. It will be understood that the invention is not limited to these specific embodiments.

Preparation of complex A and hardener A.

One mol of aluminum chloride was dissolved to 80 g. of tetrahydrofurfuryl alcohol. The solution was heated to 40° to 50° C. 2 mols of phenyl glycidyl ether were added to the solution during about 30 minutes. After the addition, they were made to react at 90° C. for 2 hours to obtain complex A (solution).

One mol of salicylic acid was added to the above obtained complex A solution and was made to react at 100° to 105° C. for 1 hour to obtain hardener A.

Preparation of complex B and hardener B.

One mol of aluminum chloride was dissolved to 100 g. of tetrahydrofurfuryl alcohol. One mol of butyl glycidyl ether and 1 mol of trialkyl acetic acid glycidyl ester (an epoxy equivalent of 240 and said trialkyl having six to seven carbon atoms total) were added to the solution and they were made to react at 110° C. for 3 hours. The tetrahydrofurfuryl alcohol was distilled away to obtain complex B.

One mol of salicylic acid was added to the solution of complex B prepared in the same manner. A reaction was carried out according to preparation of hardener A to obtain hardener B.

Preparation of complex C and hardener C.

One mol of ferric chloride was added to 100 g. of tetrahydrofurfuryl alcohol. The mixture was heated to 60° C. to dissolve the ferric chloride. The solution was then cooled to about 40° C. 2 mols of styrene oxide were added to the solution during about 40 minutes. Meanwhile the reaction temperature was kept at 40° to 50° C. After the addition of the styrene oxide, the reaction temperature was elevated to 100° C. and a reaction was carried out for 2 hours to obtain complex C solution. The tetrahydrofurfuryl alcohol was distilled away to obtain a complex C.

One mol of salicylic acid was added to the solution of complex C prepared in the same manner. A reaction was carried out according to preparation of hardener A to obtain hardener C.

Preparation of complex D and hardener D.

One mol of boron trifluoride ether complex was dissolved to 100 g. of tetrahydrofurfuryl alcohol. While the temperature was kept at 40° to 50° C., 2 mols of phenyl glycidyl ether were gradually added to the solution. Then a reaction was carried out to 80° to 90° C. for 2 hours to obtain a complex D solution. The tetrahydrofurfuryl alcohol was distilled away to obtain complex D.

One mol of salicylic acid was added to the complex D solution prepared in the same manner. A reaction was carried out according to preparation of hardener A to obtain hardener D.

Preparation of hardener E.

13.3 g. (0.1 mol) of aluminum chloride and 13.8 g. (0.1 mol) of salicylic acid were added to 80 g. of tetrahydrofurfuryl alcohol and were heated to 80° C. to react until there was no more production of hydrogen chloride. Then 30 g. (0.2 mol) of phenyl glycidyl ether were added thereto to react at 80° C. for about 1 hour and 30 minutes. The tetrahydrofurfuryl alcohol was distilled away to obtain hardener E.

Preparation of hardener F.

One mol of aluminum chloride was dissolved to 100 g. of benzene.

Two mols of styrene oxide were added to the solution and they were made to react at about 70° C. for 3 hours.

Then 1 mol of salicylic acid was added to the solution and a reaction was carried out at about 70° C. for 1 hour to obtain hardener F.

Examples 1 to 4 and Comparative examples 1 to 4

To the mixtures of epoxy resin A which is a diglycidyl ether of glycol obtained by additionally reacting on the average 2.2 mols of propylene oxide with 1 mol of 2,2-bis-(4-hydroxyphenyl)-propane and has an epoxy equivalent of 345 and a viscosity of 32 poises at 25° C., and epoxy resin B which is a polyvlycidyl ether of 2,2-bis-(4-hydroxyphenyl)-propane and has an epoxy equivalent of about 380, were added at various rates an addition product of diaminodiphenylmethane and epoxy resin B at a ratio of 25:10 (mole : mole), dibutyl phthalate, tetrahydrofurfuryl alcohol, salicylic acid, complex A, complex B and hardener A.

The thus obtained hardenable compositions were cured at 20° C. and the gelling time was measured.

The ratios (in parts by weight) of the respective ingredients in such compositions and the results are shown in table 1.

TABLE 1

|  | Examples | | | | Comparative examples | | | |
|---|---|---|---|---|---|---|---|---|
|  | 1 | 2 | 3 | 4 | 1 | 2 | 3 | 4 |
| Epoxy resin A | 10 | 10 | 10 | 10 | 10 | 10 | 10 | 10 |
| Epoxy resin B | 10 | 10 | 10 | 10 | 10 | 10 | 10 | 10 |
| Dibutyl phthalate | 3 | 3 | 3 | 3 | 3 | 3 | 3 | 3 |
| Addition product of diaminodiphenylmethane and epoxy (resin B at a ratio of 25:10 mole:mole) | 7 | 7 | 7 | 7 | 7 | 7 | 7 | 7 |
| Tetrahydrofurfuryl alcohol | 0.2 | 0 | 0 | 0 | 0 | 2 | 0.8 | 0.8 |
| Salicylic acid | 0.4 | 0.2 | 0 | 0.2 | 0 | 0.2 | 0.4 | 0.4 |
| Complex A | 0 | 0 | 0 | 0 | 0 | 0 | 0.6 | 1 |
| Complex B | 0 | 0 | 0 | 0 | 0 | 1 | 0 | 0 |
| Hardner A | 0.6 | 0.8 | 1 | 1 | 0 | 0 | 0 | 0 |
| Gelling time (in minutes) | 53 | 95 | 90 | 45 | (1) | 240 | 160 | 100 |

[1] 1-2 days.

Examples 5 to 7 and Comparative examples 5 to 9

With epoxy resin A an epoxy resin B was mixed a polyamide (an amine value of 480) obtained from an ethylenediamine and dimer acid or a polymethylene-polyphenylamine (consisting of 50 percent diaminodiphenylmethane, 20 percent of a condensate of 3 mols of aniline and 2mols of formaldehyde and 30 percent of a polycondensate of aniline and formaldehyde) obtained from aniline and formaldehyde as it was or together with other ingredients. The mixtures were set at 20° C. and the gelling time was measured.

The ratios (in parts by weight) of the respective ingredients and the results are shown in table 2.

TABLE 2

|  | Examples | | | | Comparative examples | | | | |
|---|---|---|---|---|---|---|---|---|---|
|  | 5 | 6 | 7 | 8 | 5 | 6 | 7 | 8 | 9 |
| Epoxy resin A | 10 | 10 | 10 | 10 | 10 | 10 | 10 | 10 | 10 |
| Epoxy resin B | 10 | 10 | 10 | 10 | 10 | 10 | 10 | 10 | 10 |
| Polyamide | 10 | 10 |  |  | 10 | 10 |  | 10 | 10 |
| Polymethylenepolyphenylamine |  |  | 6 |  |  |  | 6 |  | 6 |
| Dibutyl phthalate |  |  | 4 |  |  |  | 4 |  | 4 |
| Complex C |  |  |  |  |  |  |  | 0.6 |  |
| Complex D |  |  |  |  |  |  |  |  | 0.6 |
| Hardener C | 0.6 |  | 1 |  |  |  |  |  | 1 |
| Hardener D |  | 0.6 |  |  |  |  |  |  |  |
| Hardener F |  |  |  | 0.6 |  |  |  |  |  |
| Gelling time (in minutes) | 70 | 48 | 65 | 67 | 150 | (1) | 110 | 95 | 120 |

[1] 1-2 days.

Examples 9 to 13

According to the above-mentioned example 1, to mixtures of epoxy resin A, and epoxy resin B and trialkyl acetic acid glycidyl ester were added at various rates an addition product of diaminodiphenylmethane and epoxy resin B, tetrahydrofurfuryl alcohol, dibutyl phthalate, salicylic acid and hardener A. The thus obtained hardenable compositions were set at 20° C. and the gelling time was measured.

After the gelling, the hardened products were left to stand in water at b 1° to 2° C. for about 72 hours and the low-temperature adhesion strength (tensile shearing strength) in water was measured. The ratios (in parts by weight) of the respective ingredients in these compositions and the results of the measurements are shown in table 3.

TABLE 3

| Examples | 9 | 10 | 11 | 12 | 13 |
|---|---|---|---|---|---|
| Epoxy resin A | 10 | 10 | 10 | 10 | 10 |
| Epoxy resin B | 10 | 10 | 10 | 10 | 10 |
| Trialkyl acetic acid glycidyl ester | 2 | 2 | 2 | 2 | 2 |
| Addition product of diaminodiphenylmethane and epoxy resin B at a ratio of 25:12.5 (mole:mole) | 6.38 | | | | |
| Addition product of diaminodiphenylmethane and epoxy resin B at a ratio of 25:11.8 (mole:mole) | | 6.81 | 6.63 | | |
| Addition product of diaminodiphenylmethane and epoxy resin B at a ratio of 25:11.8 (mole:mole) | | | | 6.92 | 6.66 |
| Dibutyl phthalate | 4.26 | 3.9 | 3.8 | 3.76 | 4.08 |
| Tetrahydrofurfuryl alcohol | 0.34 | 0.21 | 0.42 | 0.19 | 0.18 |
| Salicylic acid | 0.34 | 0.43 | 0.52 | 0.38 | 0.36 |
| Hardener A | 0.68 | 0.65 | 0.63 | 0.75 | 0.72 |
| Gelling time (in minutes) | 90 | 75 | 65 | 70 | 65 |
| Tensile shearing strength (in kg./cm.²) | 31.7 | 42.7 | 39.0 | 33.4 | 28.6 |

Example 14

A hardenable composition prepared by mixing epoxy resin A, epoxy resin B, in addition product of diaminodiphenylmethane and epoxy resin B at a ration of 25:10 (mole : mole), dibutyl phthalate, tetrahydrofurfuryl alcohol and a hardener B was hardened at 20° C. The gelling time was measured. After the gelling, the composition was left to stand at the room temperature for 7 days. Then the hardness, Crush and Berg transition point, tensile elongation and water absorption of the hardened product were measured.

The ratios (in parts by weight) of the respective ingredients in the above-mentioned composition and the results of the tests are shown in table 4.

Comparative example 10

A mixture of 1 mol of aluminum chloride and 2 mols of salicylic acid was refluxed in benzene until hydrogen chloride was no longer produced. After the reaction, the solvent was removed by distillation to obtain a chelate compound.

Then, according to example 14, curing tests were made. The ratios (in parts by weight) of the respective ingredients in this composition and the results of the tests are shown in table 4.

TABLE 4

| | Example 14 | Comparative Example 10 |
|---|---|---|
| Epoxy resin A | 10 | 10 |
| Epoxy resin B | 10 | 10 |
| Addition product of diaminodiphenylmethane and epoxy resin B at a ratio of 25:10 (mole:mole) | 7.14 | 7.14 |
| Dibutyl phthalate | 2.86 | 2.86 |
| Tetrahydrofurfuryl alcohol | 2 | 0.6 |
| Hardener B | 1 | |
| Chelate compound obtained from 1 mol of aluminum chloride and 2 mols of salicylic acid | | 0.4 |
| Gelling time (in minutes) | 60 | 180 |
| Shore hardness (in scale D) | 71 | 62 |
| Crush and Berg (in ° C.) | 27.8 | 18.1 |
| Tensile strength (in kg./cm.²) | 241.3 | 139.4 |
| Elongation (in percent) | 13 | 28 |
| Water absorption (in percent) | 0.74 | 0.88 |

EXAMPLES 15 to 18 and Comparative example 11

According to the above-mentioned example 1, to mixtures of epoxy resin A and epoxy resin B were added at various rates an addition product of diaminodiphenylmethane and epoxy resin B at a ratio of 25:10 (mole:mole), salicylic acid, dibutyl phthalate, tetrahydrofurfuryl alcohol, trialkyl acetic acid glycidyl ester and hardener E. The thus obtained hardenable compositions were hardened at 20° C. and the gelling time was measured.

After the gelling, the hardened products were left to stand in water at 1° to 2° C. for about 48 hours and the low-temperature adhesion strength (tensile shearing strength) in water was measured. The ratios (in parts by weight) of the ingredients in these compositions and the results of the measurements are shown in table 5.

TABLE 5

| | Examples | | | | Comparative Example 11 |
|---|---|---|---|---|---|
| | 15 | 16 | 17 | 18 | |
| Epoxy resin A | 10 | 10 | 10 | 10 | 10 |
| Epoxy resin B | 10 | 10 | 10 | 10 | 10 |
| Addition product if diaminodiphenylmethane and epoxy resin B at a ratio of 25:10 (mole:mole) | 7 | 7 | 7 | 7 | 7 |
| Dibutyl phthalate | 3 | 3 | 3 | 3 | 3 |
| Salicylic acid | 0 | 0.2 | 0.6 | 0.4 | 0 |
| Trialkyl acetic acid glycidyl ester | 0 | 0 | 0 | 2 | 0 |
| Tetrahydrofurfuryl alcohol | 0 | 0 | 0 | 0.2 | 0 |
| Hardner E | 1 | 1 | 1 | 0.64 | 0 |
| Gelling time (in minutes) | 85 | 57 | 27 | 62 | (¹) |
| Tensile shearing strength (in kg./cm.²) | | | 44.4 | 41.1 | 0 |

¹ 2 days.

EXAMPLES 19 to 23 and Comparative examples 12 and 13

To epoxy resin A, a mixture of epoxy resin B and butyl glycidyl ether and a mixture of epoxy resin A and epoxy resin B and butyl glycidyl ether were added at various ratios an addition product of diaminodiphenylmethane and epoxy resins A and B at a ratio of 25:2.5:10(mole : mole : mole), addition product of diaminodiphenylmethane and epoxy resin B at a ratio of 25:10 (mole : mole), dibutyl phthalate, salicylic acid, salicyclic acid glycidyl ester, furfuryl alcohol, tetrahydrofurfuryl alcohol and hardener A to obtain hardenable compositions.

Two cement mortar samples were bonded together by using the thus obtained hardenable compositions and were left to stand at 5° C. for 7 days in various states and then the bending strength of the bonded samples was measured.

The cement mortar sample used was a square column of 40×40×80 mm. made according to Japanese Industrial Standard (JIS) R5201 and was used after being dipped in water for 4 weeks. The surface of 40×40 mm. was made a bonding surface.

The bending strength was measured at 25° C. by applying a load at a velocity of 5 kg./sec. to the bonding part in the middle of a distance of 100 mm. made between fulcra.

The mixing ratios (in parts by weight) of the ingredients in the abovegmentioned hardenable compositions and the results of the measurements are shown in Table 6.

In table 6, there are also shown comparative examples in which a polyamide obtained from ethylenediamine and dimer acid and triethylenetetramine were used as hardeners.

In table 6, "Dry mortar (in air)" shows the case that two mortar samples dipped in water for 4 weeks and then dried at the room temperature for 7 days were bonded together by coating the bonding surfaces with the curing composition and were left to stand at 5° C.

"Wet mortar (in air)" shows the case that two mortar samples dipped in water for 4 weeks were wiped on the surfaces with cloth, were then bonded together by coating the bonding surfaces with the hardenable composition and were left to stand at 5° C.

"Wet mortar (in water)" shows the case that two mortar samples dipped in water for 4 weeks wiped on the surfaces with cloth, were then bonded together by coating the bonding surfaces with the hardenable composition, were dipped in water at one end up to 70 mm. from the end and were left to stand at 5°C.

The bending strength of the mortar samples dipped in water for 4 weeks and dried at the room temperature for 7 days was about 56.0 kg./cm.².

TABLE 6

|  | Examples | | | | | Comparative examples | |
|---|---|---|---|---|---|---|---|
|  | 19 | 20 | 21 | 22 | 23 | 12 | 13 |
| Composition: | | | | | | | |
| Epoxy resin A | | 25 | 50 | 75 | 100 | 50 | 50 |
| Epoxy resin B | 89 | 66.8 | 44.5 | 22.5 |  | 44.5 | 44.5 |
| Butyl glycidyl ether | 11 | 8.2 | 5.5 | 2.25 |  | 5.5 | 5.5 |
| Addition product of diaminodiphenylmethane and epoxy resin A and epoxy resin B at a ratio of 25:2.5:10 (mole:mole:mole) | | 19.8 | 18.4 | 16.8 | 15.3 | 13.8 |  |
| Addition product of diaminodiphenylmethane and epoxy resin B at a ratio of 25:10 (mole:mole) | 18.4 | 17.1 | 15.7 | 14.3 | 12.8 |  |  |
| Dibutyl phthalate | 18.2 | 16.9 | 15.5 | 14.0 | 12.7 |  |  |
| Salicylic acid | 2.63 | 2.45 | 2.25 | 2.05 | 1.85 |  |  |
| Furfuryl alcohol | 0.78 | 0.73 | 0.67 | 0.62 | 0.57 |  |  |
| Tetrahydrofurfuryl alcohol | 3.68 | 3.43 | 3.15 | 2.85 | 2.59 |  |  |
| Hardener A | 1.52 | 0.98 | 0.90 | 0.82 | 0.74 |  |  |
| Polyamide |  |  |  |  |  | 60 |  |
| Triethylenetetramine |  |  |  |  |  |  | 10 |
| Bending strength (in kg./cm.²): | | | | | | | |
| Dry mortar (in air) | Broken in the mortar layer | | | | ᴬ 53.8 | ᴮ 6.0 | ᴮ 6.3 |
| Wet mortar (in air) | Broken in the mortar layer | | | |  | ᴮ 4.3 | ᴮ 0.7 |
| Wet mortar (in water) | ᴬ 29.8 | ᴬ 19.3 | ᴬ 20.6 | ᴬ 16.0 | ᴬ 10.1 | ᴮ 4.4 | ᴮ <0.5 |

NOTES.—ᴬ Broken on the mortar-bonding agent boundary surface.

ᴮ Broken in the bonding agent.

The metal halide (II–a) which is used for producing the hardener (II) of this invention is a halide selected from the group consisting of boron halide, aluminum family metal halides and ferric halide. The term "aluminum family metal" refers to the group of elements consisting of aluminum (Al), Gallium (Ga), Indium (In) and Thallium (Tl). Examples of the metal halides and the functional derivatives thereof (II–a) suitable for use in the present invention include, for example, aluminum chloride, aluminum bromide, boron trifluoride, ferric chloride, ferric bromide, boron trichloride, indium trichloride, gallium trichloride and complexes, such as boron trifluoride-ether complex and the like.

What is claimed is:

1. A hardenable epoxy resin composition which contains as essential constituents
    a. at least one epoxy compound which contains on the average more than one adjacent epoxy group per molecule and
    B. 0.01 to 35 percent by weight, based on the weight of said epoxy compound, of at least one hardener having the formula:

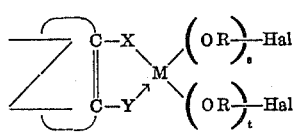

said hardener being produced by reacting
   1. the complex compound consisting of the reaction product of
       a. at least one compound selected from the group consisting of metal halides and functional derivatives of said metal halides, said metal halides being selected from the group consisting of aluminum family metal halides and ferric halide, and
       b. at least one liquid mono-1,2-epoxide, the mole ratio of said metal halide to said epoxide being in the range of 1:[1 ~ 12] 2–8 with
   2. at least one aromatic chelate-forming compound having the general formula:

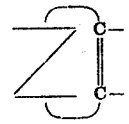

wherein X represents an atom selected from the group consisting of an oxygen atom and a sulfur atom, Y represents an organic radical containing an atom selected from the group consisting of an oxygen atom, a sulfur atom and a nitrogen atom and which can coordinate to said metal, and Z represents an organic radical which will make so as to represent a divalent aromatic radical selected from the group consisting of phenylene, substituted phenylene, naphthylene, and substituted naphthylene, the mole ratio of said metal halide to said aromatic chelate-forming compound being in the range of 1:1–2, wherein M represents an aluminum family metal atom or an iron atom, Hal represents a halogen atom, R represents a residue of said mono-1,2-epoxide, and $s+t$ ranges from 2 to 8.

2. A hardenable epoxy resin composition which contains as essential constituents
    A. at least one epoxy compound which contains on the average more than one adjacent epoxy group per molecule and
    B. 0.01 to 35 percent by weight, based on the weight of said epoxy compound, of at least one hardener having the formula:

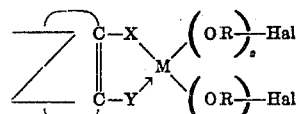

said hardener being produced by reacting
   1. the complex compound consisting of the reaction product of
       a. at least one compound selected from the group consisting of metal halides and functional derivatives of said metal halides, said metal halides being selected from the group consisting of aluminum family metal halides and ferric halide, and b. at least one liquid mono-1,2-epoxide, the mole ratio of said metal halide to said epoxide being in the range of 1:2–8 with 2. at least one aromatic chelate-forming compound having the general formula:

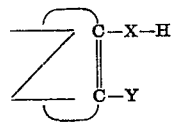

wherein X represents an atom selected from the group consisting of an oxygen atom and a sulfur atom, Y represents an organic radical containing an atom selected from the group consisting of an oxygen atom, a sulfur atom and a nitrogen atom and which can coordinate to said metal, and Z represents an organic radical which will make

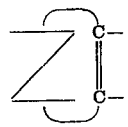

so as to represent a divalent aromatic radical selected from the group consisting of phenylene, substituted phenylene, naphthylene and substituted naphthylene, the mole ratio of said metal halide to said aromatic chelate-forming compound being in the range of 1:1–2, wherein M represents an aluminum family metal atom or an iron atom, Hal represents a halogen atom, R represents a residue of said mono-1,2-epoxide and $s+t$ ranges from 2 to 8, and C. at least one additional hardener selected from the group consisting of an amino compound and a polyamide.

3. A method of hardening a composition according to claim 2, which comprises hardening said composition at a low temperature in water.

4. A hardenable epoxy resin composition according to claim 2, in which said metal halide is a ferric halide, M represents an iron atom, and said additional hardener is an addition product of an aromatic amine with a liquid epoxy compound containing on the average not more than two 1,2-epoxy groups per molecule.

5. A hardenable epoxy resin composition according to claim 2, in which said metal halide is a ferric halide, M represents an iron atom, and said additional hardener is a polyamide.

6. A hardenable epoxy resin composition according to claim 2, in which said metal halide is an aluminum halide, M represents an aluminum atom, and said additional hardener is an addition product of an aromatic amine with a liquid epoxy compound containing on the average not more than two 1,2-epoxy groups per molecule.

7. A hardenable epoxy resin composition according to claim 2, in which said metal halide is an aluminum halide, M represents an aluminum atom, and said additional hardener is a polyamide.

8. A hardenable epoxy resin composition which contains as essential constituents A. at least one epoxy compound which contains on the average more than one adjacent epoxy group per molecule and B. 0.01 to 35 percent by weight, based on the weight of said epoxy compound, of at least one hardener having the formula:

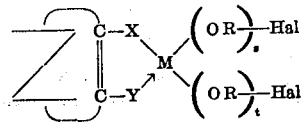

said hardener being produced by reacting
1. the complex compound consisting of the reaction product of
a. at least one compound selected from the group consisting of metal halides and functional derivatives of said metal halides, said metal halides being selected from the group consisting of aluminum family metal halides and ferric halides, and
b. at least one liquid mono-1,2-epoxide, the mole ratio of said metal halide to said epoxide being in the range of 1:2–8 with
2. at least one aromatic chelate-forming compound having the general formula:

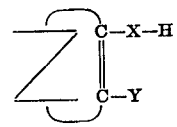

wherein X represents an atom selected from the group consisting of an oxygen atom and a sulfur atom, Y represents an organic radical containing an atom selected from the group consisting of an oxygen atom, a sulfur atom and a nitrogen atom and which can coordinate to said metal, and Z represents an organic radical which will make

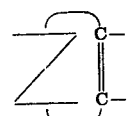

so as to represent a divalent aromatic radical selected from the group consisting of phenylene, substituted phenylene, naphthylene and substituted naphthylene, the mole ratio of said metal halide to said aromatic chelate-forming compound being in the range of 1:1–2, wherein M represents an aluminum family metal atom or an iron atom, Hal represents a halogen atom, R represents a residue of said mono-1,2-epoxide and $s+t$ ranges from 2 to 8, and C. at least one addition product of an aromatic amine with a liquid epoxy compound containing on the average not more than two 1,2-epoxy groups per molecule, and D. a salicyclic acid and E. a tetrahydrofurfuryl alcohol.

9. A process for preparing an epoxy resin which comprises hardening at least one epoxy compound which contains on the average more than one adjacent epoxy group per molecule, by admixing therewith from 0.01 to 35 percent by weight, based on the weight of said epoxy compound, of at least one hardener having the formula

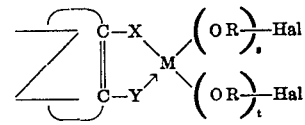

wherein M is selected from the group consisting of an aluminum family metal atom and an iron atom, Hal represents a halogen atom, R represents a residue of a liquid mono-1,2-epoxide, $s+t$ ranges from 2 to 8, X represents an atom selected from the group consisting of an oxygen atom and a sulfur atom, Y represents an organic radical containing an atom selected from the group consisting of an oxygen atom, a sulfur atom and a nitrogen atom and which can coordinate to M, and Z represents an organic radical which will make

so as to represent a divalent aromatic radical selected from the group consisting of phenylene, substituted phenylene, naphthylene and substituted naphthylene.

* * * * *

UNITED STATES PATENT OFFICE
CERTIFICATE OF CORRECTION

Patent No. 3,626,022                    Dated December 7, 1971

Inventor(s) Hiroshi Suzuki and Yasusi Nakamura

It is certified that error appears in the above-identified patent and that said Letters Patent are hereby corrected as shown below:

Column 17, line 74; change "1:[1∿12]2-8" to ---1 : 2-8---.

Signed and sealed this 11th day of July 1972.

(SEAL)
Attest:

EDWARD M. FLETCHER, JR.              ROBERT GOTTSCHALK
Attesting Officer                    Commissioner of Patents